H. B. KEIPER.
REACTION SHOCK ABSORBER.
APPLICATION FILED JAN. 5, 1914.

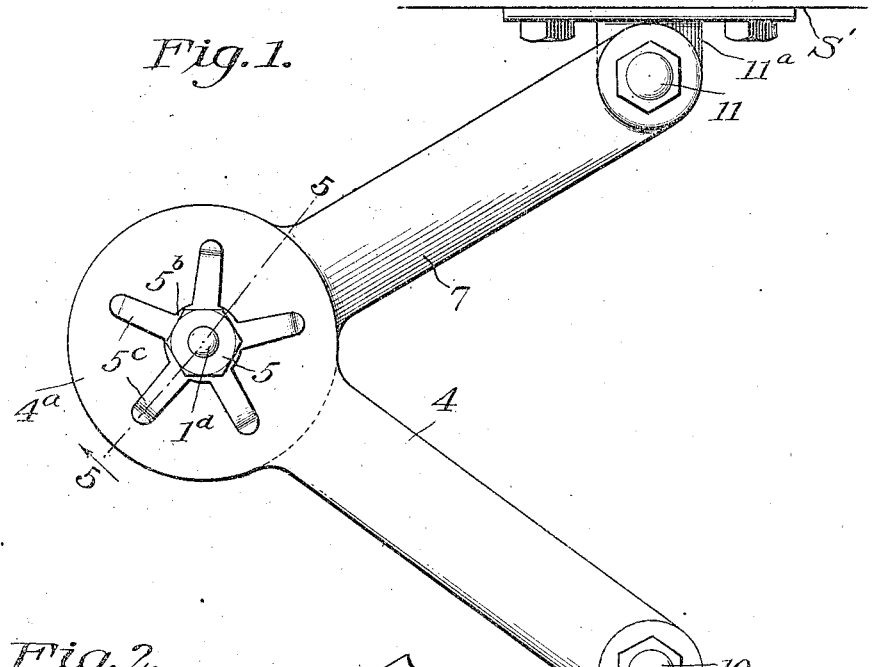

1,243,181.

Patented Oct. 16, 1917.
2 SHEETS—SHEET 2.

Witnesses
Bernadine M. Ferriter.
W. Wallace Nairn Jr.

Inventor
Henry B. Keiper
By Dowell & Dowell
his Attorneys

UNITED STATES PATENT OFFICE.

HENRY B. KEIPER, OF LANCASTER, PENNSYLVANIA.

REACTION SHOCK-ABSORBER.

1,243,181.    Specification of Letters Patent.    Patented Oct. 16, 1917.

Application filed January 5, 1914. Serial No. 810,393.

*To all whom it may concern:*

Be it known that I, HENRY B. KEIPER, a citizen of the United States, residing at Lancaster, in the county of Lancaster and State of Pennsylvania, have invented certain new and useful Improvements in Reaction Shock-Absorbers; and I hereby declare that the following is a full, clear, and exact description thereof, reference being had to the accompanying drawings, which form part of this specification.

This invention may properly be called a reaction shock absorber, and its object is to provide a novel means for preventing excessive reaction of vehicle springs, and for checking the rebound movement thereof without shock, and without interfering with the free cushioning action of such springs.

The invention is particularly designed for use on automobiles, and will permit the springs to freely perform their normal functions of supporting the load and cushioning by their compression the shocks incident to travel of the vehicle over rough roads, or to the wheels entering depressions or striking obstructions in the roadway while the reaction-shock absorber comes into play only during reaction or rebound of the spring.

A further object of my invention is to provide a reaction shock absorber that can be very cheaply constructed, and will be as efficient in action as the best and highest priced shock absorbers now on the market.

In the accompanying drawings illustrating an embodiment of my invention,

Figure 1 is a side view of the reaction shock absorber as connected to a vehicle spring.

Fig. 2 is a side view of such absorber with the outer member and some of the interior parts broken away.

Fig. 3 is a sectional view on line 3—3, Fig. 5;

Figure 4:
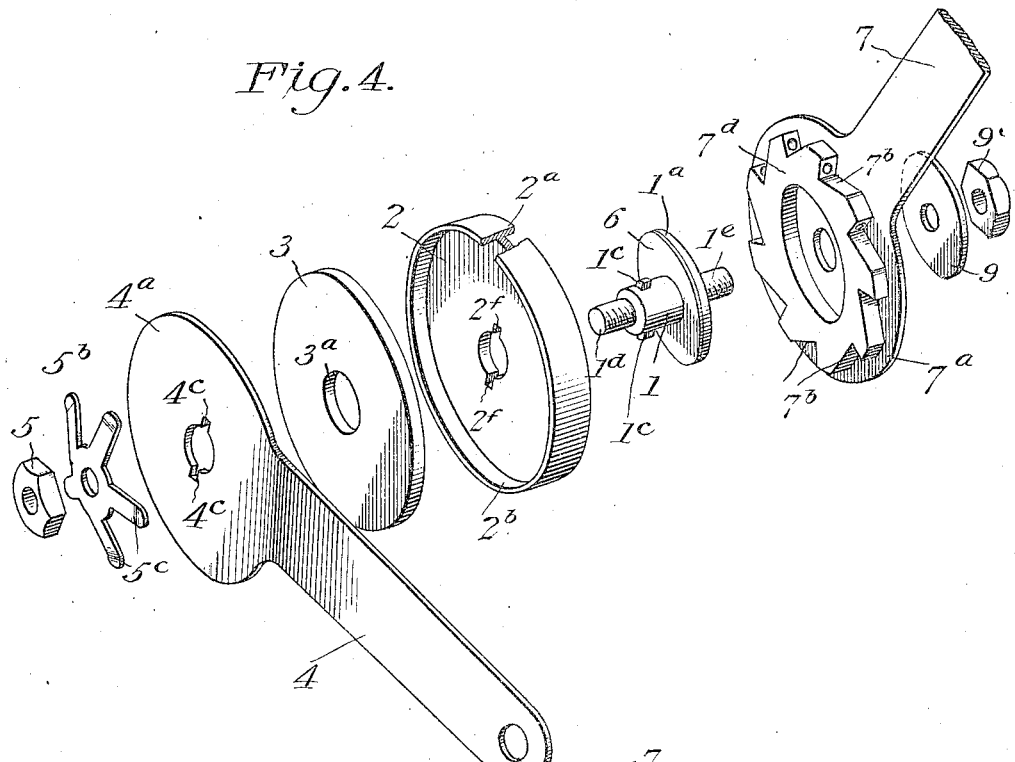
Fig. 4 is a perspective view of the several parts of my reaction shock absorber separated but in axial alinement.

As illustrated in the drawings the reaction shock absorber comprises the following principal parts; a stub-shaft 1, a friction member 2; a clutch 7$^d$, a lever 7; a second lever member 4, a friction disk 3 engaging member 2 and 4; means for regulating the friction; and devices for locking the clutch member 7$^d$ to the friction member 2 on one movement of the levers, and for disengaging same on the reverse movement of said levers.

The stub-shaft 1 is provided with a fixed collar or circumferential flange 1$^a$, against one side of which collar abuts a friction member 2 that is rotatably mounted upon the said stub-shaft 1. This member 2 preferably has an annular peripheral flange 2$^a$ on its face adjacent collar 1$^a$ and also has an annular peripheral flange 2$^b$ on its other face.

Fitted within the flange 2$^b$ and against the outer face of the member 2 is a friction disk 3, which may be of wood or any other suitable material, and which is preferably thicker than the depth of the flange 2$^b$, so that it will project slightly beyond the outer edge of the said flange when pressed against the web of the member 2. Said disk has a bore 3$^a$ preferably of larger diameter than the stub-shaft.

At the outer side of the friction disk 3 is a lever 4 having a head 4$^a$ fitted on the end of stub-shaft 1, and preferably corresponding in exterior contour with the friction member 2, except where the arm 4 extends radially therefrom. The head 4$^a$ should be fixed to the stub-shaft 1 so as not to rotate thereon and I preferably provide the shaft 1 with diametrically opposite keys 1$^c$ which are adapted to engage corresponding key slots 4$^c$ in the head 4$^a$ of the lever as shown. The arm 4 of the lever is adapted to be connected at its outer end either to the vehicle spring or to a support on the vehicle as hereinafter explained.

The stub-shaft 1 projects through the head 4$^a$ of the lever and its outer end portion 1$^d$ is preferably reduced in diameter and threaded for the engagement of a nut 5. Interposed between the nut 5 and the head 4$^a$ is a spring washer 5$^b$ which may be of any suitable form, and is shown as provided with radial spring fingers 5$^c$.

Figure 5:
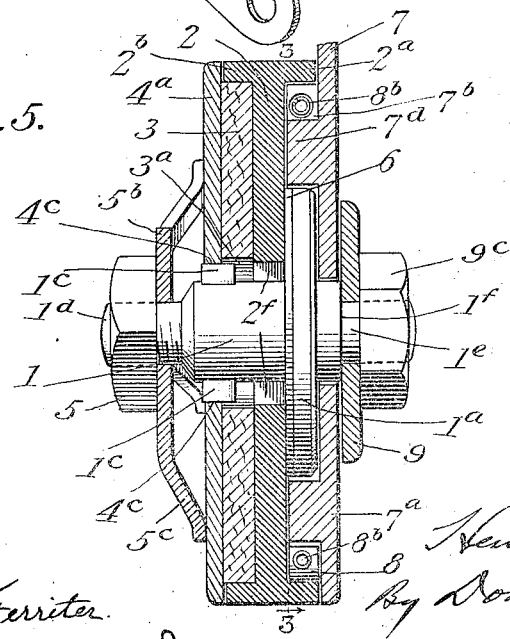
Fig. 5 is an enlarged sectional view on the line 5—5, Fig. 1.

When the parts are assembled as shown in Figs. 1 and 5, the friction member 2 and disk 3 will be clamped together and between the collar or abutment 1$^a$ and the head 4$^a$; and the frictional pressure between these parts can be nicely regulated by adjusting the nut 5.

The axial opening in the friction member 2 is provided with radial slots 2$^f$ to permit the friction member to be readily slipped on or off the stub-shaft and over the keys 1$^c$, in assembling the parts. The friction member 2 and disk 3 are rotatable on the stub-shaft 1, but the lever 4 is rigidly locked to said shaft.

When the parts are properly assembled frictional contact is made between the opposed faces of the friction member 2 and disk 3; and between the opposed faces of head $4^a$ and disk 3, and also between the opposed faces of the friction member 2 and the abutment or collar $1^a$. If desired a washer 6 of fiber, or of frictional material may be interposed between the friction member 2 and abutment $1^a$ both to prevent noise or "squeak", and to increase the frictional resistance to rotary movement of the member 2 on shaft 1.

On the stub-shaft 1, at the side of the collar or abutment $1^a$ opposite the friction member 2, is loosely mounted the head $7^a$ of a second lever 7, the head $7^a$ approximately corresponds in external contour to the friction member 2, and formed on or rigidly attached to the inner face of head $7^a$ is an annular clutch member $7^d$ slightly larger in internal diameter than the collar or abutment $1^a$, so that said clutch member can freely surround said collar; said clutch member is of an external diameter to fit easily within annular flange $2^a$ on the friction member 2, and in the periphery of this clutch member $7^d$, are a series of inclined notches $7^b$ in each one of which is a movable clutch device, preferably a roller 8, which is interposed between said clutch member $7^d$ and the inner periphery of the flange $2^a$; and the parts are so formed and related that if the lever 7 be moved in one direction relative to the friction member 2, the clutch member 8 will instantly engage the flange $2^a$ and lock the lever 7 to friction member 2, but if the lever 7 be moved in the opposite direction the clutch member 8 will instantly release the flange $2^a$ and free the lever 7 from said friction member 2. I preferably employ springs $8^b$ to cause the clutch roller 8 to instantly lock the members $7^a$ and 2 together upon one movement of the lever 7, while instantly disengaging them on the reverse movement of said lever.

It is important that the lever 7 can move in the reverse direction not only free from the clutch devices but also free from friction or restraint of any kind, and for this purpose the head $7^a$ is axially bored to fit loosely on the stub-shaft 1, and it is freely confined on said stub-shaft between the outer side of the collar $1^a$ and a washer 9 which is strung on a reduced threaded portion $1^e$ of the stub-shaft 1 and abuts against a shoulder $1^f$ on said shaft, and is retained in place by means of a nut $9^c$ screwed on the threaded portion $1^e$. It will be seen by reference to Figs. 3 and 5 that while the washer 9 can be set up hard against the shoulder $1^f$ by means of a nut $9^c$ it cannot clamp or bind the head $7^a$ of lever 7 between the washer 9 and collar or abutment $1^a$, and said head has no frictional contact with said collar or said washer 9; and there is nothing to interfere with free downward movement of the lever 7; but upon the return movement of lever $7^a$ the clutch devices will lock head $7^a$ to friction member 2 and consequently the latter must turn on the stub-shaft 1, and this movement of friction member 2 will be resisted by all the friction produced by and between said friction member 2 the abutment $1^a$, friction disk 3, and head $4^a$ on lever 4.

As shown the lever 4 is pivotally connected at its outer end by a bolt 10 to a clip or member $10^a$ of any suitable construction attached to a lower member S; and the arm 7 is similarly pivotally connected by a bolt 11 to a clip or member $11^a$ attached to an upper member S'. The part S' might be the body of the vehicle and the part S the running gear thereof; and the former might be supported upon the latter by any suitable arrangement of springs without affecting the operation of my reaction shock absorber. The pivots 10 and 11 should be connected to the levers 4 and 7 in such manner as to exert no friction thereon; such pivotal connections need no particular description as they are all well known. As illustrated in Fig. 1 the reaction shock absorber is applied in the usual position between the upper and lower members of an elliptic spring, which is only partially indicated at S, S', in the drawings.

In use the levers 4 and 7 stand normally at an angle of approximately 45° to each other, when the spring and parts are in normal position. Any movement of the pivots 10 and 11 toward each other, will move the levers 4 and 7 toward each other; while any movement of the pivots away from each other will swing the levers 4 and 7 apart.

In the construction illustrated in Fig. 1, the part S' is supported by springs upon the part S so that the spring will be compressed by the load; in such case my reaction shock absorber will only come into actual operation when the parts S and S' tend to separate; or upon reaction of the spring after compression.

When a load is suddenly placed on the body, or the vehicle runs over an obstruction, or when for any reason the parts S and S' are moved toward each other violently, or otherwise, the shock of such movement is absorbed by the spring in the usual manner and the lever 7 swings freely toward the lever 4 because of the free pivotal connection of lever 7 with the shaft 1, and the clutch devices 8 move into the deeper parts of the notches out of contact with the flange $2^a$ and do not interfere with the free downward movement of lever 7. The friction member 2 however is held stationary on the shaft 1 by the frictional contact between it and the opposed parts fixed to the shaft 1. The moment that the load is released, or the springs start to react, so as to move the points 10 and 11 apart, the clutch devices 8 instantly engage the flange 2$^a$ and lock the lever 7 to the friction member 2 and the latter is compelled to turn on the shaft 1, and in so doing such member must overcome the friction exerted to hold it in fixed relation to the shaft; consequently the reaction or rebound of the spring is opposed by the amount of friction pressure on the member 2. This friction pressure should be such as will retard the return movement of the spring sufficiently to bring it substantially to rest when it reaches its normal expansion limit, according to the load thereon, and prevent its reacting or rebounding beyond this normal limit with any appreciable jar or shock. If, before the spring reaches its normal position, the vehicle be again subjected to a shock tending to cause points 10 and 11 to move toward each other, the clutch devices instantly disengage lever 7 from friction member 2 and allows the spring to absorb such shock without having to exert any additional effort to overcome friction; but the instant the spring again reacts the frictional resistance comes into play and the reaction is slowed and the rebound-shock absorbed as described. It will be seen that there is no resistance offered by my shock absorber to the movement of the points 10 and 11 toward each other but instant resistance is presented to any separating movement of such points.

The friction member 2 always turns in one direction upon the stub shaft 1; it remains stationary when the lever 7 moves toward lever 4, and is turned only when the levers tend to separate, or move away from each other.

What I claim is:

1. A reaction shock absorber comprising a stub-shaft having an abutment, a lever fixedly connected with said shaft, a friction member rotatably mounted on said shaft adjacent said abutment, a friction disk between said lever and friction member, and means for frictionally binding said lever, disk member and abutment together on said shaft; with a second lever loosely pivoted on said shaft at the side of the abutment opposite said friction member and out of contact with said abutment; means for holding said loose lever in axial position on the shaft without friction, clutch devices for locking said loose lever to said friction member only when said fixedly connected lever moves in one direction, thereby compelling said friction member to rotate in one direction only on the shaft, said clutch devices not interfering with the free return movement of said loose lever.

2. A reaction shock absorber comprising a pair of levers each pivoted at one end to one member of movable spring-connected parts of a vehicle, their other ends being supported about a common axis, one lever being fixed to rotate with said axis and the other loose thereon; said axis having a fixed annular abutment thereon intermediate its ends, a friction member loose on and adapted to revolve independently of said axis in frictional engagement with said abutment, a friction disk loose on said shaft beside said friction member in frictional contact therewith and frictionally engaging a friction surface on said fixed lever, and a clutch device at the other side of said friction member for locking the other lever thereto to cause them to rotate together in one direction only, whereby movement of the levers in one direction is unretarded while movement thereof in the opposite direction is opposed by frictional resistance between said friction member and said clutch member at one side and between said friction member and disk and the friction surface of the adjacent lever at the other side.

3. A shock absorber comprising a stub shaft having a fixed collar thereon, a pair of levers, one loose and adapted to swing freely on said shaft in one direction only and the other fixed on said shaft so as to revolve therewith; the free ends of said levers being adapted for connection with opposed relatively movable spring-connected parts of a vehicle, a rotatable friction member loose on said shaft in frictional contact with said fixed collar, a friction disk between said friction member and a frictional contact surface on said fixed lever, and means for holding said fixed lever, disk, friction member and abutment in frictional contact, a clutch member at the opposite side of said friction member, and means for locking said clutch member to said friction member so as to prevent movement of the loose lever in one direction only, the latter lever being adapted to move freely in the opposite direction.

4. In a shock absorber, the combination of a stub shaft, a pair of levers mounted thereon, one loose and the other fixed thereto so as to revolve therewith, a collar fixed on said shaft, a friction plate having an annular laterally projecting flange revolubly mounted on said shaft beside said collar, a friction disk between said friction plate and a frictional contact portion of said fixed lever, a clutch device on the opposite side of said friction plate consisting of a revoluble disk loose on said shaft and having a series of peripheral recesses providing cam surfaces underlying said flange on said friction plate, and spring-pressed anti-friction devices in said recesses adapted to engage said flange and lock the lever thereto when the lever is moved in one direction and to release the lever when moving in the opposite direction.

5. A reaction shock absorber comprising a stub-shaft having a fixed collar thereon, a disk-like friction member independently revolubly fitted on said shaft in frictional engagement with said collar, a lever having a head-portion or friction member keyed on said shaft so as to rotate therewith, a friction disk independently revolubly fitted on said shaft between and in frictional engagement with said friction members, a nut screwed on said shaft, and means for holding said friction members, disk and collar in frictional engagement; said shaft having on the opposite side of said collar a reduced screw threaded end-portion with a nut thereon and a washer abutting a shoulder at the junction of the major and reduced portions of the shaft, a lever having a head-portion loose on said shaft between said collar and washer, and means for locking said loose lever to the shaft so as to cause it to turn therewith when moving in one direction while allowing it to move freely in the opposite direction; the free ends of said levers being adapted for connection with opposed relatively movable spring-connected parts of a vehicle, whereby frictional resistance is exerted against the movement of said fixed lever either toward or from said loose lever and against movement of the loose lever in one direction only.

6. In a shock absorber, a pair of levers adapted to swing toward and from each other about a common axis while their free ends are connected to opposed relatively movable spring-connected parts of a vehicle; said axis comprising a stub-shaft having screw-threaded ends and an intermediate portion having an integral circumferential collar or abutment; one of said levers being keyed on said shaft so as to rotate therewith and the other loose thereon and adapted to swing freely about said axis, a friction member loose on said shaft beside said abutment, a friction disk between said friction member and head-portion of said fixed lever, a washer on said shaft at the other side of said abutment spaced therefrom, a lever having a head-portion loosely fitted on said shaft between said washer and abutment, means for locking and causing said last mentioned lever to turn with said shaft in one direction only, and means at the other side of said abutment for pressing said head-portion of said fixed lever and said disk and friction member together and the latter into frictional engagement with said abutment.

7. In a shock absorber, a pair of levers adapted to swing toward and from each other about a common axis while their free ends are connected to opposed relatively movable spring-connected parts of a vehicle; said axis comprising a stub-shaft having screw-threaded ends and an intermediate portion having an integral circumferential collar or abutment; one of said levers being keyed on said shaft so as to rotate and the other loose thereon and adapted to swing freely about said axis, a friction member loose on said shaft beside said abutment having laterally oppositely projecting annular flanges thereon, a friction disk underlying one of said flanges between said friction member and head-portion of said fixed lever, a washer on said shaft at the other side of said abutment spaced therefrom, a lever having a head-portion loosely fitted on said shaft between said washer and abutment, means underlying and adapted to engage one of said flanges so as to lock and cause said last mentioned lever to turn with said shaft in one direction only, and means at the other side of said abutment for pressing said head-portion of said fixed lever and said disk and friction member together and the latter into frictional engagement with said abutment.

In testimony that I claim the foregoing as my own, I affix my signature in presence of two witnesses.

HENRY B. KEIPER.

Witnesses:
CHAS. E. LONG,
A. K. SANDERS.